(No Model.)
C. C. TYLER.
METHOD OF AND APPARATUS FOR MAKING MILLING CUTTERS.
No. 530,212. Patented Dec. 4, 1894.
Fig. 1.
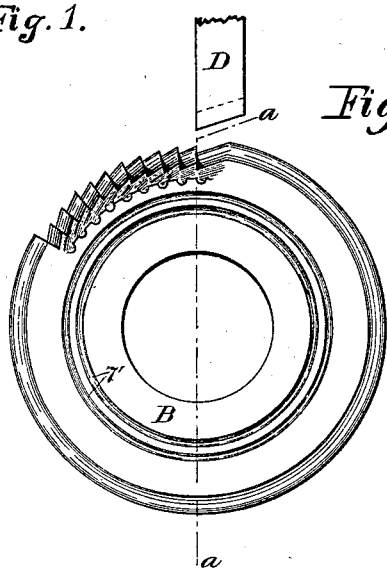
Fig. 2.
Fig. 3.
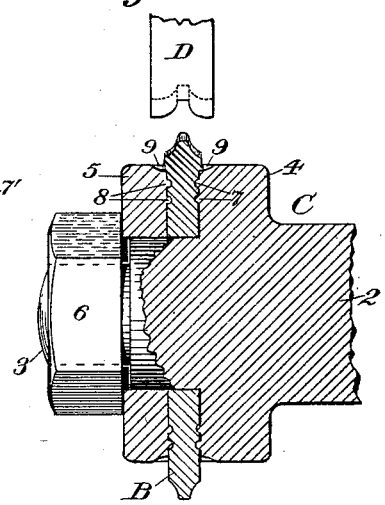
Fig. 4.
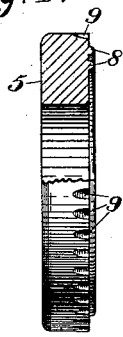
Fig. 5.
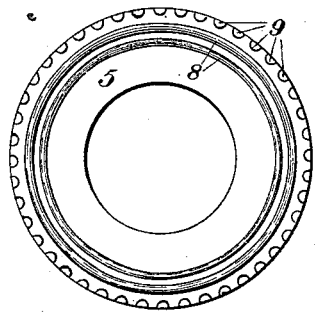
Fig. 6. Fig. 7.
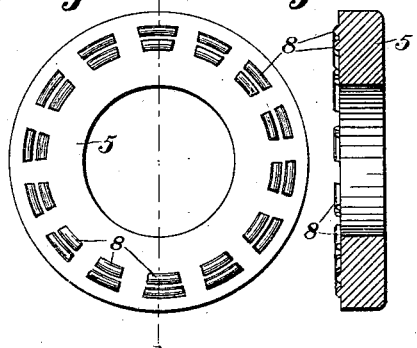
Witnesses:
Robt. V. Ruddell,
Fred. J. Dole.
Inventor:
Charles C. Tyler.
By his Attorney.
F. H. Richards

UNITED STATES PATENT OFFICE.

CHARLES C. TYLER, OF HARTFORD, CONNECTICUT.

METHOD OF AND APPARATUS FOR MAKING MILLING-CUTTERS.

SPECIFICATION forming part of Letters Patent No. 530,212, dated December 4, 1894.

Application filed April 11, 1894. Serial No. 507,135. (No model.)

*To all whom it may concern:*

Be it known that I, CHARLES C. TYLER, a citizen of the United States, residing at Hartford, in the county of Hartford and State of Connecticut, have invented certain new and useful Improvements in Methods of and Apparatus for Making Milling-Cutters, of which the following is a specification.

This invention relates to the method of and apparatus for making milling-cutters; the object of the present invention being to furnish an improved method and apparatus whereby circular milling-cutters having superior qualities may be produced with precision and economy. In the manufacture of this class of milling-cutters, as heretofore practiced, it has been customary to clamp a plane-faced milling-cutter blank between two plane-faced disks, holding-plates, or flanges on the blank-carrying spindle, depending entirely upon frictional-impingement for preventing the rotation of the blank during the formation of the successive teeth therein, the formation of the teeth being accomplished by a compressor-tool acting upon and compressing successive peripheral portions of the blank; and inasmuch as each tooth-arc inclines toward the peripheral line of the finished cutter, the successive actions of the compressor-tool, tends, in practice, to gradually rotate the cutter-blank upon the carrier-spindle, thus affecting the precision and location of successive teeth relatively to each other, some of the tooth-arcs being made of greater length than others and resulting in an equality in heights of the cutting-points of successive teeth of the completed cutter; and it is one of the chief objects of my present invention to provide means for overcoming this difficulty in the manufacture of this class of milling-cutters.

Another object of my present invention is to provide means for sustaining the cutter-blank at points concentric with the axis and between the axis and periphery thereof to intercept the flow of the metal toward the axis of the blank caused by radial compression during the operation of forming the teeth, and thereby prevent the transverse spreading of the cutter-blank in the central portion thereof, which would impair the quality of the cutter by distorting the same.

In the drawings accompanying and forming a part of this specification, Figure 1 illustrates, in side elevation, a partially-formed milling-cutter constructed in accordance with and embodying my invention, said figure showing a portion of a tooth-forming compressor-tool in its operative position relative to the cutter-blank. Fig. 2 is a cross-sectional view of the partially-completed milling-cutter illustrated in Fig. 1, taken in line *a—a* and looking toward the right hand in said figure. Fig. 3 is a longitudinal section of a portion of the cutter-blank-carrying spindle, with a cutter-blank clamped between the holding-plates thereof, said figure illustrating the action of the compressor-tool, (a portion only of which is shown) upon the blank and forming a tooth therein. Fig. 4 is an edge view, partially in section, of one form of cutter-blank-holding plates. Fig. 5 is a side view of the same. Fig. 6 is a side view of another form of cutter-blank-holding plate, and Fig. 7 is a central cross-section of the same taken in line *b—b*, Fig. 6.

Similar characters designate like parts in all of the figures.

In practice, in carrying out my improved method of making milling-cutters of the class specified, I employ a cutter-blank, B, a carrier, C, therefor, and a tooth-forming compressor-tool, D, all of which are of special form, as will be hereinafter more fully described; these elements being usually employed in connection with a machine (not shown) having facilities for intermittently rotating the blank-carrier and for operating the compressor-tool as required.

In the drawings only so much of the apparatus for carrying out the method is shown, as will enable those conversant with the art to which this invention appertains to clearly understand the same.

The carrier C comprises the carrier-spindle 2, screw-threaded at one end, as shown at 3, and two cutter-blank-holding plates, 4 and 5, the one 4 of which is herein shown as a peripheral flange formed upon the spindle 2, and the one 5 of which is in the nature of a washer, which washer is held in place upon the spindle and clamped upon the cutter-blank by means of a nut, 6, screwed upon the end 3 of the spindle 2. The holding-plates 4 and 5 are provided with circumferentially-disposed blank-engaging flanges, 7 and 8, and blank-holding notches, 9. These flanges or ribs will preferably be remote from but concentric to the peripheries thereof, and the blank-holding notches will preferably be formed in the peripheries of the holding-plates at the inner edges thereof. Formed in the outer faces of the discous cutter-forming blank B are a series of retaining-grooves, or recesses, 7' and 8', which coincide in position and number with, and are adapted to receive, the coinciding blank-engaging flanges or ribs upon the holding-plates when the cutter-blank is clamped between said plates.

In practice the circumferential flanges 7 and 8 of the holding plates 4 and 5 will be remote from the outer edges of said plates so as to leave a plane bearing face of greater or less area each side of said blank-engaging flanges to correspond with similar flat bearing faces of the blank at each side of the retaining-grooves 7' and 8'. The distances between the inner edges of said flanges and inner edges of the holding plates will be greater than the distances between the outer edges of said flanges and outer edges of said plates, this construction causing all lateral distortion of the blank to take place outside of the blank-engaging flanges to the periphery of the holding plates.

The retaining-grooves 7' and 8' may be formed in the cutter-blank simultaneously with the operation of swaging said blank, or may be subsequently formed therein, as desired.

In the drawings I have shown two slightly different forms of holding-plates for the cutter-blank. In the form illustrated in Figs. 4 and 5, the holding-plate is shown provided, upon one face thereof, with two continuous annular holding-flanges, adapted for entering coinciding annular recesses formed in the face of the cutter-blank, while in Figs. 6 and 7 the holding-plate is shown provided with a series of remotely-disposed concentric segmental flanges adapted for entering similarly-disposed coinciding grooves or recesses formed in the face of the cutter-blank. The holding-plates shown in Figs. 3, 4 and 5 have a series of shallow retaining notches, or pockets, 9, formed in their peripheries at their inner edges, each of which sets of pockets are adapted to be filled, or partially filled, at each operation of the compressor-tool with metal displaced by the peripheral compression of the blank by said tool. This filling of the retaining notches 9 by the lateral displacement of the metal of the blank during the formation of the teeth acts to lock the blank against rotation with relation to the holding-plates and insures uniformity in the formation of the teeth.

The holding-plate illustrated in Figs. 6 and 7, while having no peripheral notches to be engaged by the displaced metal of the cutter-blank, will, owing to the remote disposition of the flanges or ribs 7, perform the same function as the holding-plates illustrated in Figs. 3, 4 and 5, as will be fully understood by a comparison of the several figures of the drawings.

It will be obvious that a cutter-blank may have the segmental recesses formed in its side faces to correspond with the segmental retaining-flanges or ribs formed upon the adjacent faces of the holding-plates preparatory to the operation of forming the cutting teeth upon said blank, or that said cutter-blank may be plane-sided and be made to fill the spaces between the projections upon the holding-plates by the displacement of the metal and simultaneously with the operation of forming the cutter-teeth. In the latter case the cutter-blank will be properly annealed or softened before subjection to pressure and subsequently hardened.

The operation of making a milling-cutter of the class specified in accordance with my improved method, consists in first forming the discous blank B with one or more grooves or retaining-recesses formed in one or both faces thereof; second, clamping said discous blank between the holding-plates 4 and 5 having the retaining-flanges or ribs coinciding with and engaging in the grooves of said blank, and, third, forming successive teeth in the periphery of said blank by compressing successive peripheral portions thereof by means of the compressor-tool D in a direction crosswise to the line of the points of the cutting teeth and at such an angle thereto as is proper to form the required "relief" or backing-off for the tooth. This operation displaces a portion of the metal laterally which when the holding-plates illustrated in Fig. 3 are employed, fills, or partially fills, the peripheral retaining-pockets 9, or if the form of holding-plate illustrated in Figs. 6 and 7 is employed, fills the spaces between the segmental retaining-flanges 7 and 8, thus holding the cutter-blank against accidental rotation or movement with relation to the carrier, or holding-plates. The operation of forming one tooth being completed, the blank is advanced or rotated to bring the next successive tooth-forming portion thereof in position to be acted upon by the compressor-tool D when another compression will be made, and so on, until the entire series of teeth have been formed in the periphery of the cutter-blank. This part of the method, *i. e.*, that of forming teeth in the periphery of the cutter-blank, is substantially the same as that described in Letters Patent of the United States No. 408,446, dated August 6, 1889, heretofore granted to me, to which reference may be had.

By forming a retaining-flange, or rib, upon the inner adjacent faces of the holding-plates, and extending them into retaining-grooves formed in opposite faces of the cutter-blank, or extending them beyond the normal side-faces of said blank, the in-flow of the metal during peripheral compression is intercepted at a point adjacent to the periphery of the holding-plates, which obviates any distortion of the central portion of the cutter-blank or that portion between the inner edges of the retaining-flanges, and causing the entire compression of the blank to be sustained by that portion projecting beyond the peripheral line of the holding plates. This is a matter of great desideratum in the manufacture of this class of milling-cutters, as it prevents the possibility of cutter-teeth being thrown out of peripheral alignment.

By securely holding the cutter-blank against the possibility of rotation with relation to the spindle and holding-plates, I am enabled to secure the greatest precision in the formation of teeth thereof, maintaining equality in heights of the cutting edges of successive teeth and uniformity of angular disposition.

Having thus described my invention, I claim—

1. In an apparatus for forming teeth in cutter-blanks in combination, a cutter-blank-carrier, two cutter-blank-holding plates each having one or more circumferentially-disposed blank-engaging flanges or ribs having therein peripheral notches or recesses adapted for holding the cutter blank against circumferential movement, and a tooth-forming compressor-tool in position and adapted for operating upon and compressing successive peripheral portions of the blank held between said plates, in engagement with said flanges and notches, substantially as described.

2. In an apparatus for forming teeth in cutter-blanks, a carrier for the cutter-blank, in combination, cutter-blank-holding plates each having circumferentially-disposed blank-engaging flanges upon the inner adjacent faces thereof, and each having shallow notches or recesses in the peripheries thereof, in position and adapted for engagement by the blank when the same is clamped between said holding plates, means for clamping said plates upon the blank, and a tooth-forming compressor-tool in position and adapted for operating upon and compressing successive peripheral portions of said blank, substantially as described.

3. In an apparatus for forming teeth in cutter-blanks, a cutter-blank-carrier comprising a spindle, two holding-plates having a series of remotely disposed shallow blank-holding notches or pockets formed in their peripheries at the inner adjacent edges thereof, and, having circumferentially and oppositely disposed concentric flanges upon their adjacent side-faces, and a clamping-device for said plates, substantially as described and for the purpose set forth.

4. In an apparatus for forming teeth in cutter-blanks, in combination, a cutter-blank-carrier spindle having a fixed annular flange with one or more circumferentially disposed flanges upon the side-face thereof, and a series of shallow notches or grooves formed in one edge of its periphery, a washer or holding-plate removably fitted to said spindle and having circumferentially disposed flanges and peripheral notches coinciding with the circumferential flanges and peripheral notches, respectively, of the spindle-flange, means for clamping said washer or plate upon a cutter-blank located between said plate and spindle-flange, and a tooth-forming compressor-tool in position and adapted for operating upon and compressing successive peripheral portions of said blank to form teeth therein, substantially as described.

5. In an apparatus for forming teeth in cutter-blanks, a carrier for the cutter-blank embodying two cutter-blank-holding plates, each of which has one or more circumferentially-disposed blank-engaging flanges, and each of which has a series of peripheral recesses or blank-holding notches formed in the inner edges thereof, substantially as described and for the purpose set forth.

6. That improvement in the art of making milling-cutters of the class specified, which consists in first, forming a discous blank with one or more circumferentially-disposed grooves or recesses in one or both faces thereof, second, clamping said discous blank between holding-plates having blank-engaging flanges to coincide with and engage in the grooves of said blank, third, compressing successive peripheral portions of said blank to form successive teeth and at the same time displacing the metal of the blank projecting beyond the peripheries of the holding-plates laterally to engage holding-notches or recesses formed in said plates and intercepting the inflow of the metal beyond a certain point within the peripheries of the holding-plates to prevent distortion of the body-portion of said blank, substantially as described.

CHARLES C. TYLER.

Witnesses:
FRED. J. DOLE,
F. H. RICHARDS.